(12) United States Patent
Fraze

(10) Patent No.: US 10,689,131 B2
(45) Date of Patent: *Jun. 23, 2020

(54) SECTIONED SELF-MATING MODULAR SATELLITE BUSES

(71) Applicant: Vector Launch, Inc., Tucson, AZ (US)

(72) Inventor: Raymond Edward Fraze, Hereford, AZ (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/028,821

(22) Filed: Jul. 6, 2018

(65) Prior Publication Data

US 2020/0010221 A1 Jan. 9, 2020

(51) Int. Cl.
| | |
|---|---|
| *B64G 1/10* | (2006.01) |
| *B64G 1/44* | (2006.01) |
| *B29C 70/42* | (2006.01) |
| *B29C 70/54* | (2006.01) |
| *B29C 65/00* | (2006.01) |
| *B29C 65/56* | (2006.01) |
| *B29L 31/30* | (2006.01) |

(52) U.S. Cl.
CPC .............. *B64G 1/10* (2013.01); *B29C 65/56* (2013.01); *B29C 66/20* (2013.01); *B29C 66/43* (2013.01); *B29C 66/721* (2013.01); *B29C 70/42* (2013.01); *B29C 70/54* (2013.01); *B64G 1/443* (2013.01); *B29L 2031/3097* (2013.01); *B64G 2001/1092* (2013.01)

(58) Field of Classification Search
CPC .................. B64G 1/10; B64G 2001/1092
See application file for complete search history.

(56) References Cited

U.S. PATENT DOCUMENTS

| | | | | |
|---|---|---|---|---|
| 3,817,011 A | * | 6/1974 | Weed | .................... E04B 1/6179 |
| | | | | 29/522.1 |
| 4,397,434 A | * | 8/1983 | Farnham | ................... B64G 1/10 |
| | | | | 244/158.1 |
| 5,199,672 A | * | 4/1993 | King | ...................... B64G 1/007 |
| | | | | 244/164 |
| 5,314,146 A | | 5/1994 | Chicoine et al. | |
| 5,411,226 A | * | 5/1995 | Jones | ................... B64G 1/1085 |
| | | | | 244/173.3 |

(Continued)

FOREIGN PATENT DOCUMENTS

WO 2017/069816 A1 4/2017

OTHER PUBLICATIONS

ETA hand2mind, "Building Congruent Hexagons," 5 pages, Mar. 24, 2018.

(Continued)

*Primary Examiner* — Richard G Davis

(57) ABSTRACT

A satellite configuration includes a plurality of individual satellite buses each having a number of side panels that form a polygonal shape, where the individual satellite buses collectively fit together to form the satellite configuration having a regular polygon shape. A method of producing the satellite configuration includes forming a plurality of individual satellite buses each having a polygonal shape, and fitting the individual satellite buses together to form the satellite configuration in a regular polygonal shape.

20 Claims, 15 Drawing Sheets

(56) References Cited

U.S. PATENT DOCUMENTS

| | | | | |
|---|---|---|---|---|
| 5,613,653 | A * | 3/1997 | Bombled | B64G 1/641 244/173.1 |
| 5,624,088 | A | 4/1997 | Fiore | |
| 5,720,450 | A * | 2/1998 | Kanne | B64G 1/641 244/118.1 |
| 5,779,195 | A * | 7/1998 | Basuthakur | B64G 1/007 244/173.1 |
| 5,884,866 | A * | 3/1999 | Steinmeyer | B64G 1/002 244/137.1 |
| 6,138,951 | A * | 10/2000 | Budris | B64G 1/002 102/393 |
| 6,206,327 | B1 * | 3/2001 | Benedetti | B64G 1/10 244/159.4 |
| 6,216,410 | B1 * | 4/2001 | Haberman | E04B 1/02 52/591.1 |
| 6,276,639 | B1 * | 8/2001 | Hornung | B64G 1/002 102/489 |
| 6,296,206 | B1 * | 10/2001 | Chamness | B64G 1/00 244/173.3 |
| 6,416,018 | B2 * | 7/2002 | DiVerde | B64G 1/002 244/137.1 |
| 6,557,802 | B2 * | 5/2003 | Kroeker | B64G 1/002 244/173.3 |
| 8,366,053 | B2 * | 2/2013 | Watts | B64G 1/428 244/158.1 |
| 9,463,882 | B1 * | 10/2016 | Field | B64G 1/641 |
| 9,708,080 | B2 | 7/2017 | Judd et al. | |
| 2001/0004003 | A1 | 6/2001 | Watanabe et al. | |
| 2006/0185277 | A1 * | 8/2006 | Quincieu | B64G 1/10 52/265 |
| 2014/0319283 | A1 * | 10/2014 | Holemans | B64G 1/641 244/173.3 |
| 2016/0318635 | A1 * | 11/2016 | Field | B64G 1/641 |
| 2017/0021948 | A1 * | 1/2017 | Yehezkel | B64G 1/222 |
| 2017/0327251 | A1 * | 11/2017 | Parissenti | B64G 1/10 |

OTHER PUBLICATIONS

International Application No. PCT/US2018/046584, International Search Report & Written Opinion, 9 pages, dated Nov. 2, 2018.

International Application No. PCT/US2018/046588, International Search Report & Written Opinion, 8 pages, dated Nov. 2, 2018.

NASA, "Ames Modular Common Spacecraft Bus," 4 pages, Aug. 3, 2017.

Wikipedia, "Modular Common Spacecraft Bus," 3 pages, Mar. 11, 2018.

* cited by examiner

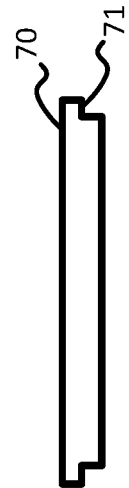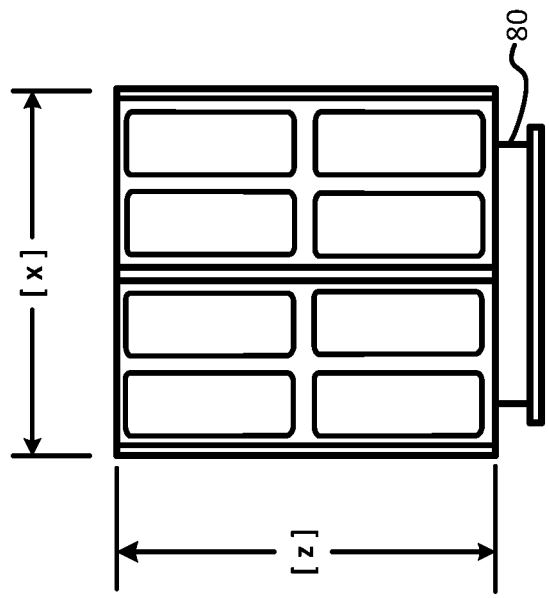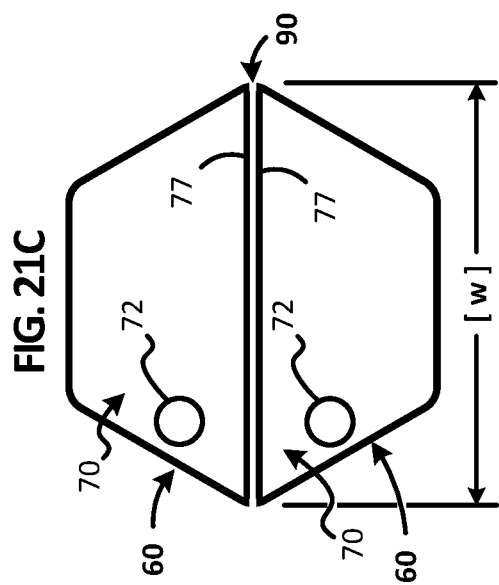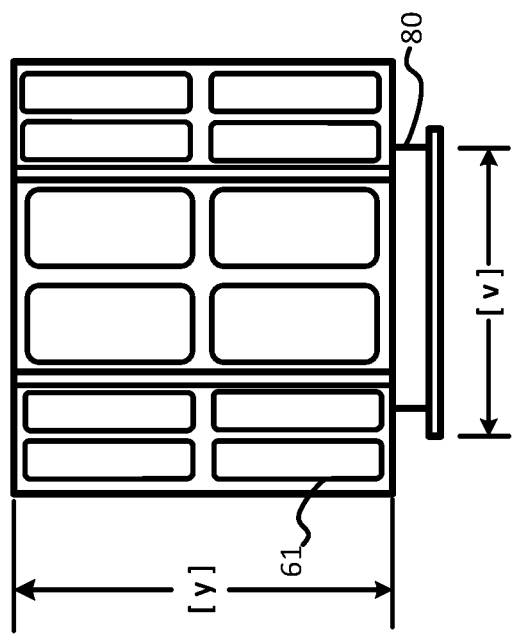
FIG. 21D
FIG. 21B
FIG. 21C
FIG. 21A

SECTIONED SELF-MATING MODULAR SATELLITE BUSES

BACKGROUND

The structural bodies of orbital satellites, space-faring probes, and some spacecraft are typically handmade. These structural bodies, referred to herein as spacecraft buses, are normally machined, cut, bonded, or molded, using very labor-intensive techniques. Each resulting spacecraft bus is semi-custom. Due to the handmade nature of these items, portions of a spacecraft bus tend to be irregular, at least to some extent. Not only are spacecraft buses time-consuming to manufacture, but the cost is considerable as well. Furthermore, the resulting buses are not uniform.

CubeSats have been recently introduced and comprise satellite devices having a uniform, albeit small, size that allows for a more consistent manufacturing process. Nevertheless, the efficiency of CubeSat production can be improved. Moreover, the small size of CubeSats limits the quantity of internal components as well as the provided functionality.

OVERVIEW

A satellite configuration includes a plurality of individual satellite buses each having a number of side panels that form a polygonal shape, where the individual satellite buses collectively fit together to form the satellite configuration having a regular polygon shape. A method of producing the satellite configuration includes forming a plurality of individual satellite buses each having a polygonal shape, and fitting the individual satellite buses together to form the satellite configuration in a regular polygonal shape.

A satellite bus, as described herein, includes a plurality of side panels each having a front surface flanked by a first longitudinal edge and a second longitudinal edge, wherein the first longitudinal edge of each side panel is nested with the second longitudinal edge of an adjacent side panel. The individual satellite panels may each include a first flange along the first longitudinal edge and a second flange along the second longitudinal edge, and the first flange superimposed on the second flange forms a joggle.

A method of producing a modular satellite bus may include forming a plurality of the side panels described above, aligning a first longitudinal edge of each side panel with a second longitudinal edge of an adjacent side panel, such that the first longitudinal edge of each side panel is nested with the second longitudinal edge of the adjacent side panel, and securing the first longitudinal edge of each side panel to the second longitudinal edge of the adjacent side panel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 21A is a front view of a satellite bus.

FIG. 21B is another front view of the satellite bus in FIG. 21A rotated 30° from the view in FIG. 21A.

FIG. 21C is a top view of satellite bus in FIG. 21A.

FIG. 21D is a side view of a top panel of the satellite bus in FIG. 21A.

DETAILED DESCRIPTION

There is an increasing demand for orbital satellites, space-faring probes, and other spacecraft. Spacecraft are typically launched for a specific purpose with customized functionality. It can be a costly ordeal to launch such spacecraft into space, with a limited amount of space onboard the rockets that launch spacecraft. In order to load multiple spacecraft into a single rocket or launch vehicle, the size of the structural bodies, referred to herein as spacecraft buses, can be a limiting factor as to the number of spacecraft that can be included in a single payload. The sectioned modular satellite buses described herein allow multiple satellite buses to maximize the space aboard a rocket. Also, the modularity of the design enables the satellite buses to be manufactured uniformly and efficiently.

Figure 1:
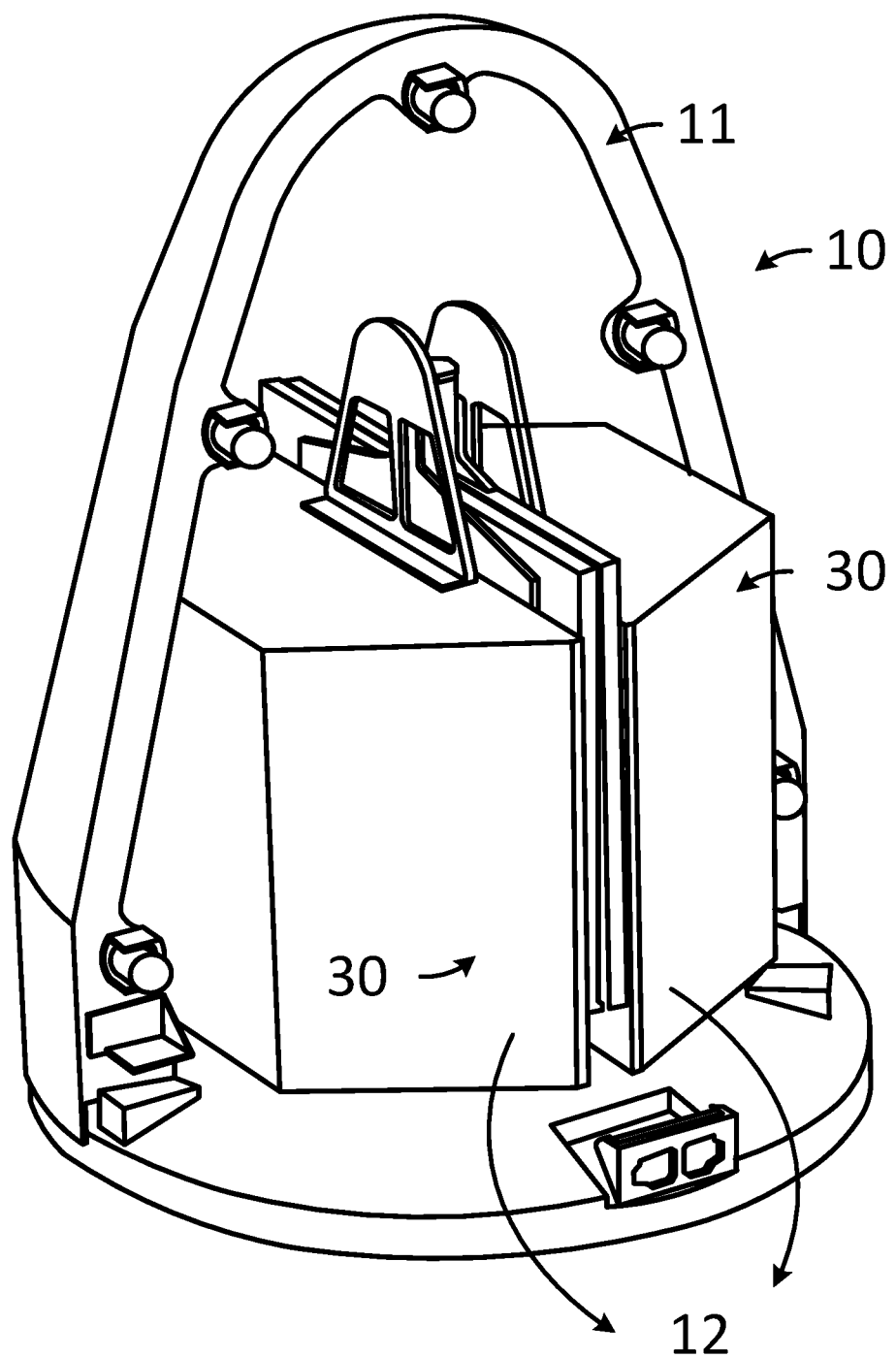
FIG. 1 is a perspective view of a sectioned modular satellite bus positioned in a cut-away fairing of a rocket.

Satellite configuration 10, as shown in FIG. 1, can provide for multiple sectioned satellite devices within a single rocket fairing. FIG. 1 shows two individual satellite buses 30 nested within a single rocket fairing 11. Each satellite bus 30 is the main structural component or framework of an associated satellite, space probe, or other spacecraft. Each of the individual satellite buses 30 comprises a portion of a regular polygonal shape, and the individual satellite buses 30 fit together to form a combined satellite configuration 12 in with a regular polygon shape for the combination. As used herein, the term "regular polygon" refers to a polygon in which associated angles are roughly equal, and associated faces are roughly equal in area. Length of the faces might vary based on a selected height. Satellite configuration 12 is formed of individual satellite buses 30 that are fit together, and there may be minor spacing between individual satellite buses 30 due to the presence of solar panels or other exterior features positioned between individual satellite buses 30 that cause the overall sides and angles of satellite configuration 12 to be not exactly equal, but in general the faces and angles of the satellite configuration 12 are essentially equal. Thus, the individual satellite buses are referred to herein as sectioned satellite buses, as 'sections' of regular polygonal shapes.

By fitting individual satellite buses 30 together, satellite configuration 12 allows multiple satellite buses 30 to fit into a fairing or nose cone of a rocket 11, thereby maximizing the payload space aboard the rocket 11, as shown in cut-away detail in FIG. 1 with satellite configuration 12 positioned inside the rocket fairing 11.

In FIG. 1, each of the individual satellite buses 30 is in the shape of an isosceles trapezoid, which is equivalent to half of a hexagon with the hexagon divided along the maximum diameter. Thus, together the two individual half-hexagon satellite buses 30 form a regular hexagonal satellite configuration 12. Other configurations formed by sectioning regular polygonal shapes can be employed. These might form a similar combined hexagonal shape as seen in FIG. 1, or might instead use other polygonal shapes with 3-n sides.

Figure 3:
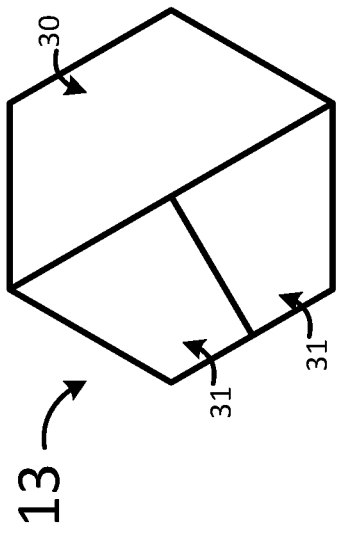
FIG. 3 is another plan view of a sectioned modular satellite bus.
Figure 2:
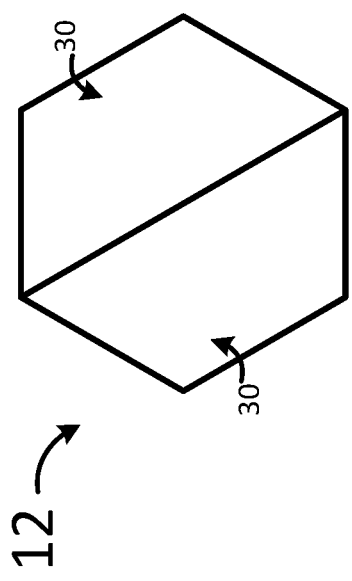
FIG. 2 is a plan view of a sectioned modular satellite bus.
Figure 4:
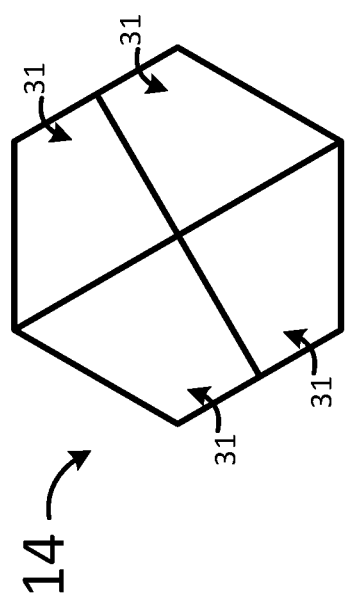
FIG. 4 is another plan view of a sectioned modular satellite bus.

FIGS. 2-7 detail further hexagonal sectioned-satellite buses. FIG. 2 is a top plan view of satellite configuration 12 in FIG. 1, with each satellite bus 30 having a half-hexagon shape. Each individual satellite buses may differ in polygonal shape. For example, as shown in FIG. 3, one of the individual satellite buses 30 may have a half-hexagon shape that is fit together with two individual satellite buses 31 each having a quarter-hexagon shape, thereby forming a satellite configuration 13 having a regular hexagon shape. As another alternative, satellite configuration 14 shown in FIG. 4, the two halves 30 could be split once again to form four individual quarter-hexagon satellite buses 31.

Figure 5:
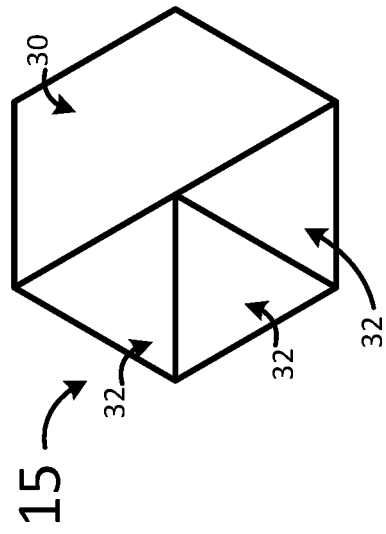
FIG. 5 is another plan view of a sectioned modular satellite bus.
Figure 7:
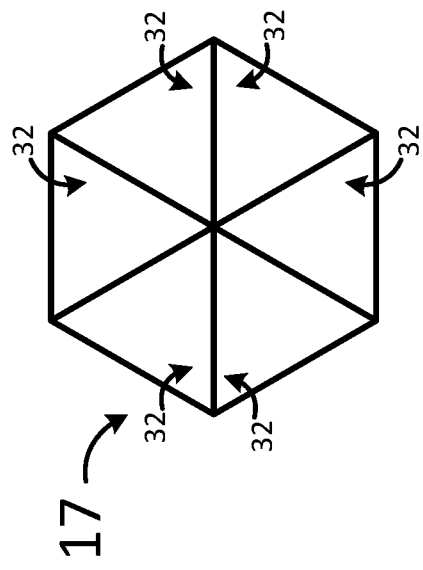
FIG. 7 is another plan view of a sectioned modular satellite bus.
Figure 6:
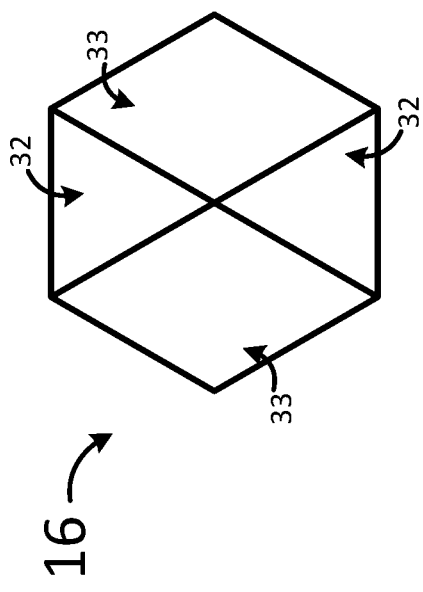
FIG. 6 is another plan view of a sectioned modular satellite bus.

Similar to FIG. 3, FIG. 5 shows satellite configuration 15 composed of a half-hexagon satellite bus 30, but instead of the other half being divided into two half-hexagon satellite buses, the other half is divided into three triangular satellite buses 32. FIG. 6 shows satellite configuration 16 divided into four individual satellite buses that are not all equal sizes namely two quarter-hexagon satellite buses 32 and two rhomboid satellite buses 33. FIG. 7 shows satellite configuration 17 divided into six individual satellite buses 32 that are equally-sized triangles.

Figure 9:
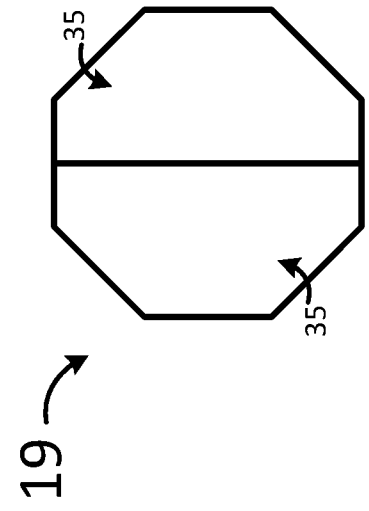
FIG. 9 is another plan view of a sectioned modular satellite bus.
Figure 8:
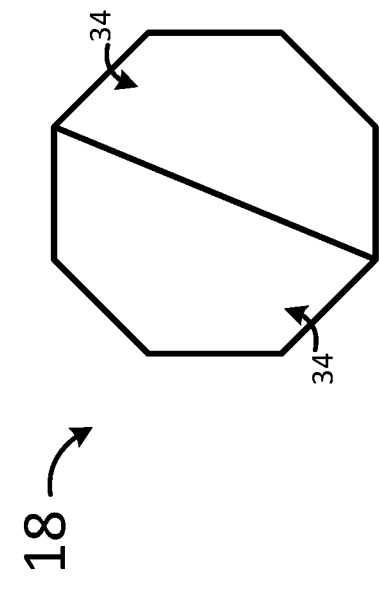
FIG. 8 is another plan view of a sectioned modular satellite bus.
Figure 11:
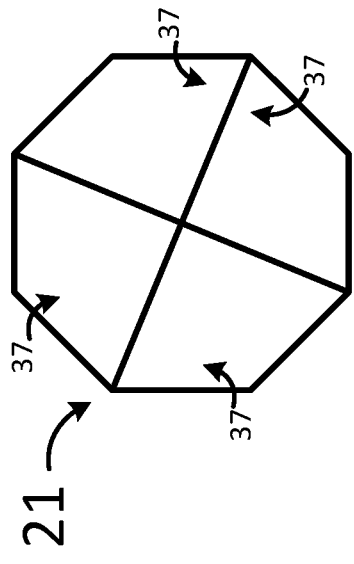
FIG. 11 is another plan view of a sectioned modular satellite bus.
Figure 12:
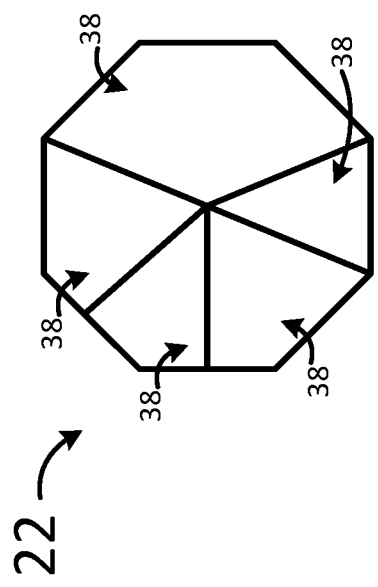
FIG. 12 is another plan view of a sectioned modular satellite bus.
Figure 10:
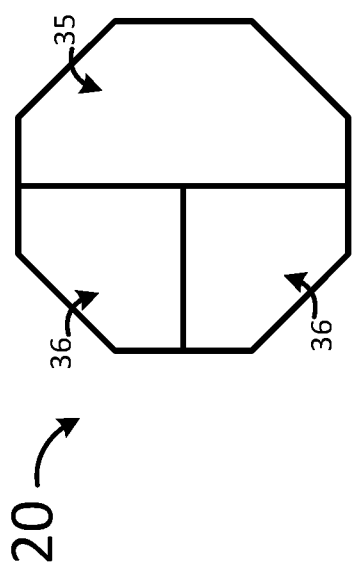
FIG. 10 is another plan view of a sectioned modular satellite bus.

Turning now to a discussion on octagonal-shaped satellite configurations, these configurations have satellites that when combined or fit together form a generally octagonal polygon. FIG. 8 shows satellite configuration 18 divided along the maximum diameter into two half-octagon satellite buses 34. Thus, together the two individual half-octagon satellite buses 34 form a regular octagonal satellite configuration 18. Similar to FIG. 8, FIG. 9 shows satellite configuration 19 divided along the minimum diameter into two individual half-octagon satellite buses 35, which together form a regular octagonal satellite configuration 19. FIG. 10 shows satellite configuration 20 composed of a half-octagon shape satellite bus 35 that is fit together with two individual satellite buses 36 each having a quarter-octagon shape. FIG. 11 shows yet another satellite configuration 21 composed of four individual quarter-octagon satellite buses 37. Satellite configuration 22 shown in FIG. 12 includes five individual satellite buses 38 of various shapes and sizes that, when fit together, form an octagonal configuration.

While FIGS. 2-12 show hexagonal and octagonal satellite configurations, satellite configuration may be virtually any polygonal shape, such as triangular, square, pentagonal, heptagonal, and the like. Other satellite configurations than discussed herein may be employed, and composed of various combinations of polygonal shapes that, when combined, form a regular polygon.

The individual satellite buses may be fit together, either in a securely fastened manner or simply by being placed in contact with one another, in order to form a combined satellite configuration. For example, side panels of adjacent individual satellite buses may include fastening elements that hold the adjacent satellite buses securely against one another, at least until the combined satellite configuration is released or deployed from the launch vehicle in space. Such fastening elements may include clamps, mounting flanges, explosive bolts, release mechanisms, deployers, actuators, or other fastening elements. Alternatively, the individual satellite buses may be positioned in close contact with one another in the launch vehicle with no fastening elements devices holding the satellite buses together. Fairing 11 or associated elements might be configured to compress or otherwise hold individual satellite buses together.

Figure 13:
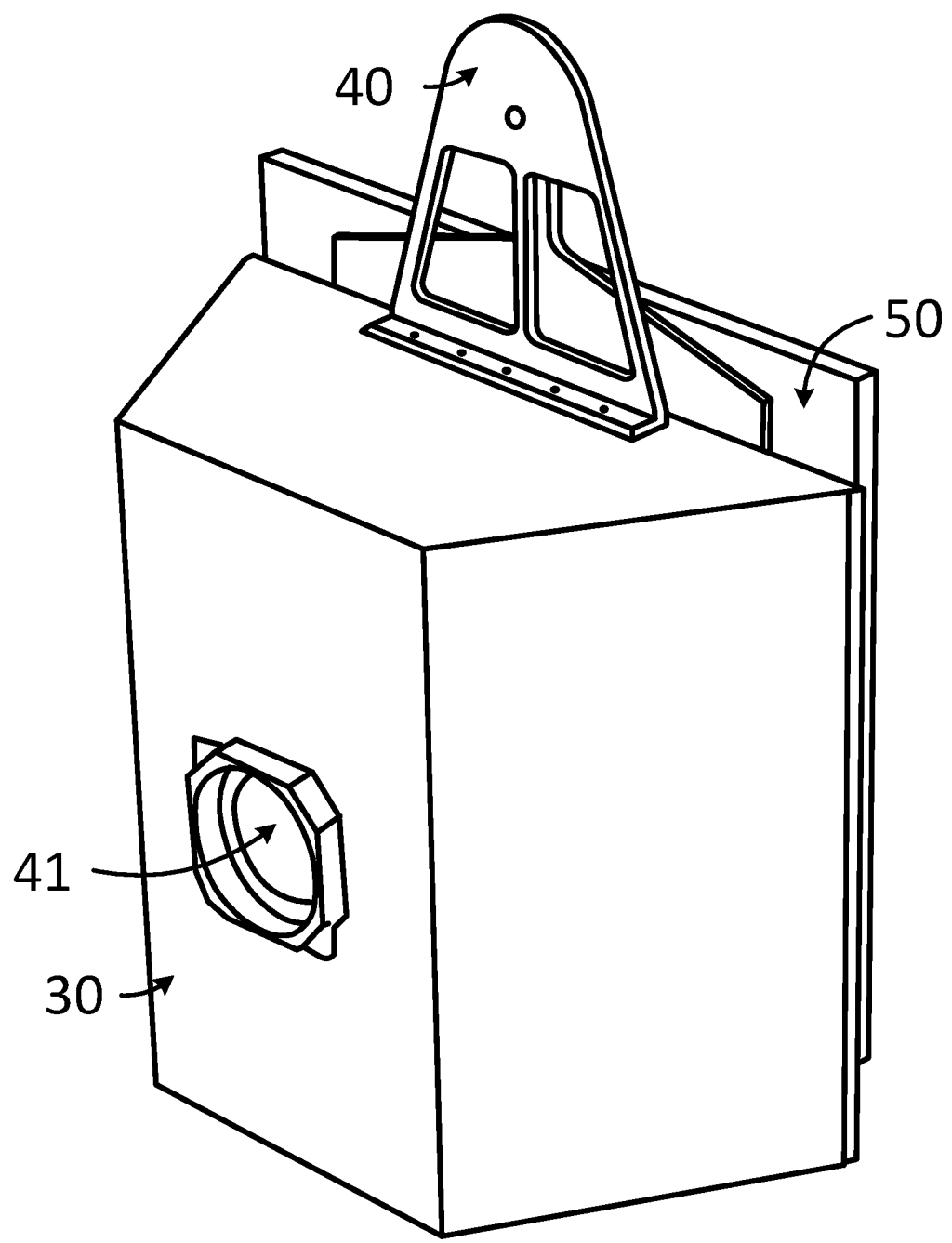
FIG. 13 is a perspective view of an individual satellite bus.
Figure 14:
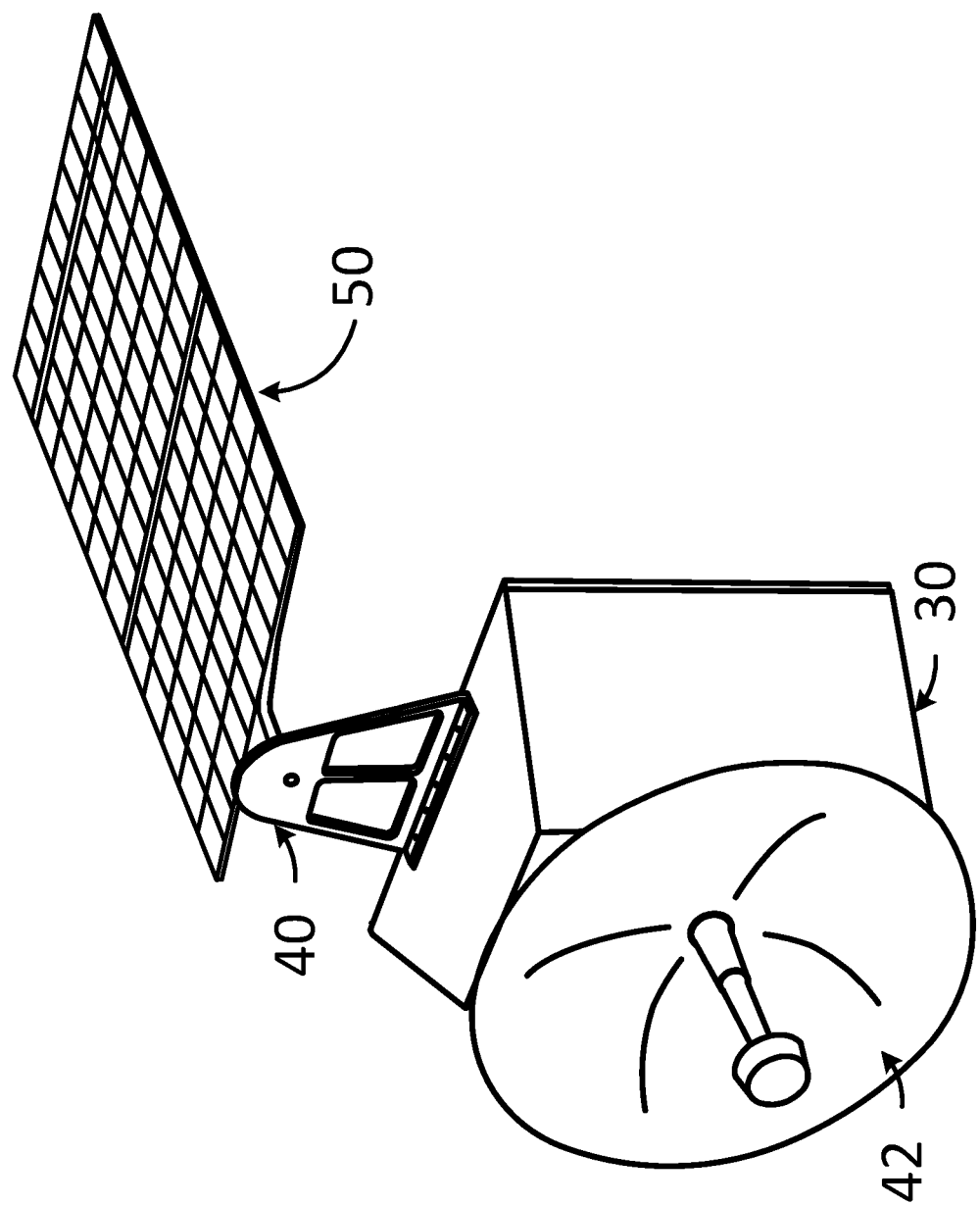
FIG. 14 is another perspective view of an individual satellite bus.

According to certain examples, one or more of the individual satellite buses may include external and/or internal components. For example, as shown in FIGS. 13 and 14, an individual satellite bus 30 may have a mounting flange 40 on a side panel and/or a top panel for attaching a solar panel 50 or a window to satellite bus 30. The solar panel 50 may be folded against one side panel of the satellite bus 30, as shown in FIG. 13, to accommodate fitting the individual satellite bus 30 together with one or more individual satellite buses to form a combined satellite configuration. FIG. 13 also shows feature aperture 41. Feature aperture 41 might house various external elements for later deployment or extension from satellite bus 30.

When the individual satellite bus 30 is separated from the other individual satellite buses, solar panel 50 may be extended, as shown in FIG. 14, with mounting flange 40 serving as a hinge that allows for extension, deployment, or movement of solar panel 50. FIG. 14 also includes communication array 42. Array 42 might comprise one or more antennas, such as the dish configuration shown in FIG. 14. Array 42 might be stored in a collapsed or other compact shape until deployment, such as held in feature aperture 41 or extended from an interior space of satellite bus 30 through feature aperture 41.

Figure 15:
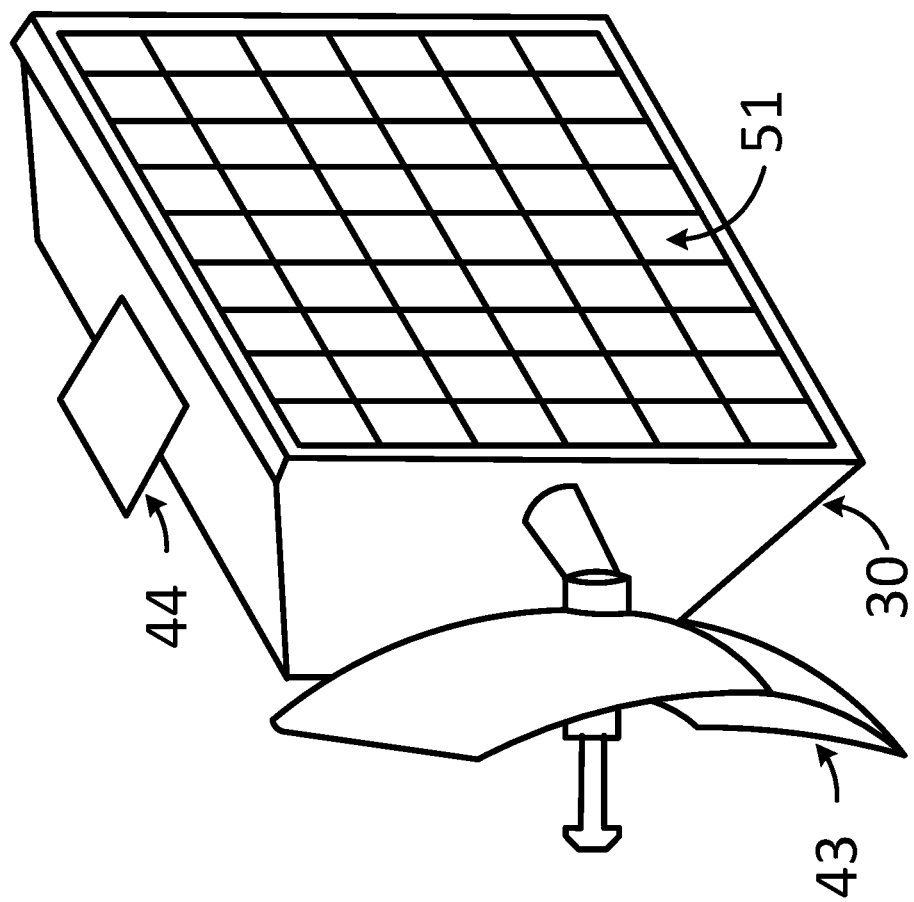
FIG. 15 is another perspective view of an individual satellite bus.

Rather than having a mounting flange, the individual satellite bus may include a face-mounted solar panel 51 or a window that either serves as a side panel or is flush with a side panel, as shown in FIG. 15. FIG. 15 also shows an alternative arrangement for antenna array 43, namely protruding from different face/side than FIG. 14. Various other external features might be provided, such as element 44 which can comprise heat radiators, mounting flanges, or other equipment.

Figure 16:
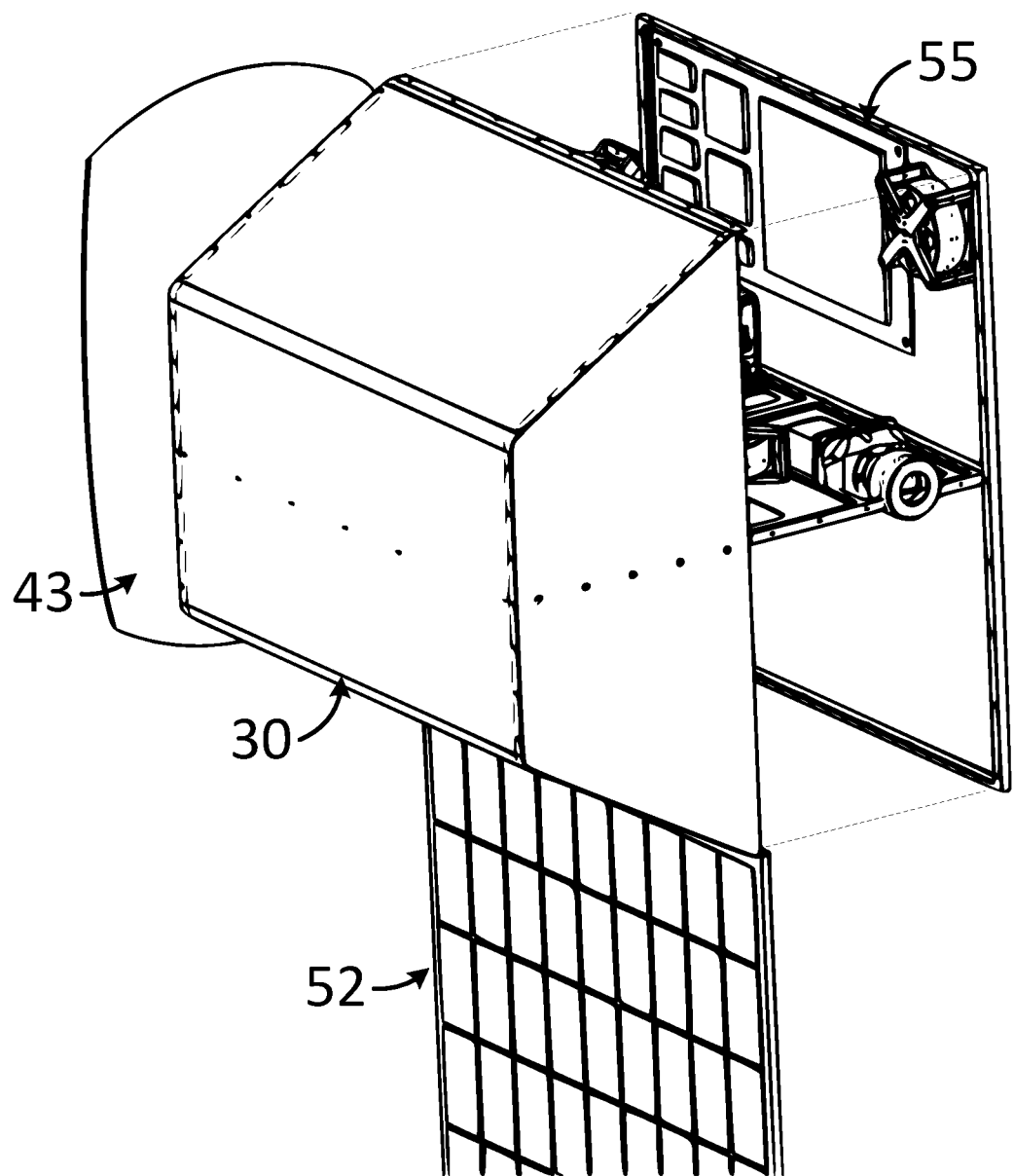
FIG. 16 is a perspective view of an individual satellite bus with a side panel spaced apart from the rest of the bus to show part of the interior of the bus.
Figure 17:
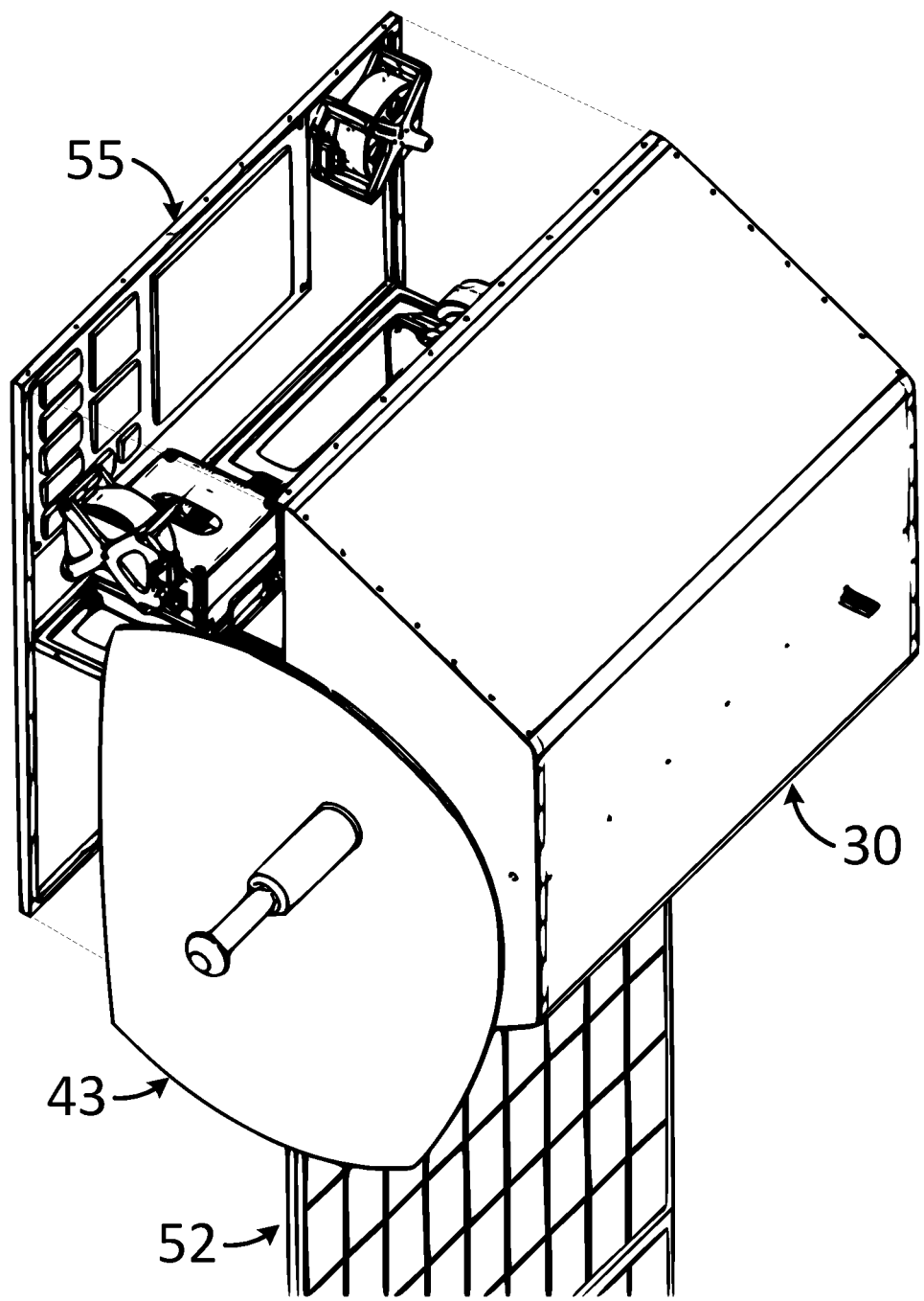
FIG. 17 is another perspective view of the individual satellite bus shown in FIG. 16.

FIGS. 16 and 17 provide an exploded view that illustrates internal components that may be included in individual satellite buses, such as satellite bus 30. In FIGS. 16 and 17, satellite bus 30 has antenna array 43, but also has another example configuration of solar panels 52. Internal components of satellite bus 30 may include one or more internal decks 55.

Internal deck 55 illustrates an example of internal components of a satellite bus, such as satellite bus 30. Each shape of satellite bus might have a different size and shape of internal space to accommodate internal components. These internal components can include a propulsion deck or an avionics deck, for example. The avionics deck may include computer equipment, data storage equipment, data communication equipment, sun sensors, star trackers, radio frequency (RF) transceivers, optical transceivers, reaction wheels, wire harnesses, power bus equipment, internal heat radiator connections, and/or any other avionics features.

According to certain examples, the individual satellite buses discussed herein may be formed using self-mating techniques. This self-mating refers to a configuration where each of the side panels of the individual satellite bus fit or nest together without requiring additional support materials. Self-mating can also be referred to herein as self-jigging. Fasteners or adhesives may be used to secure the side panels to one another, but no additional framework materials are required to build the individual satellite bus. FIG. 18-22 discuss self-mating modular satellite bus configurations, which might be employed for any of the satellite configurations of FIGS. 1-17.

Figure 18:
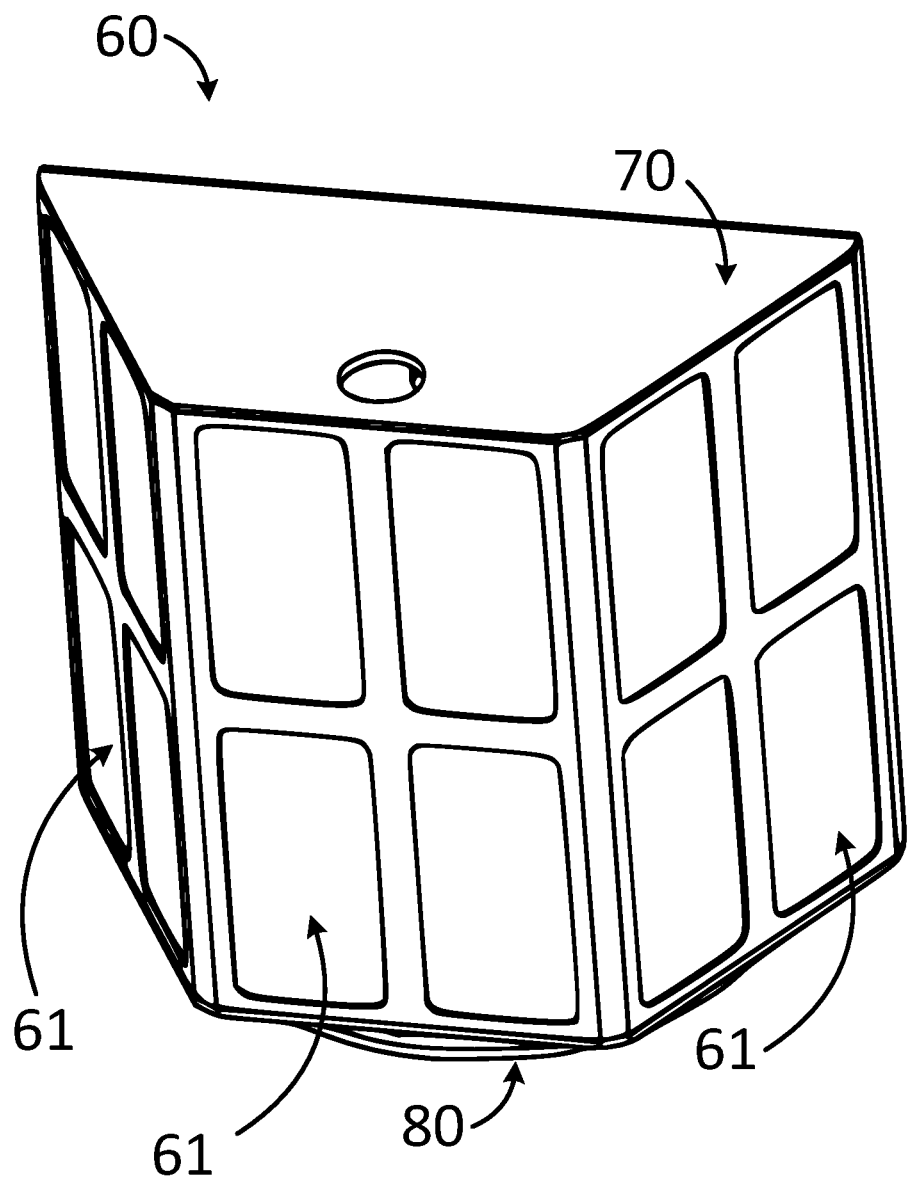
FIG. 18 is a perspective view of a self-mating modular satellite bus.
Figure 22:
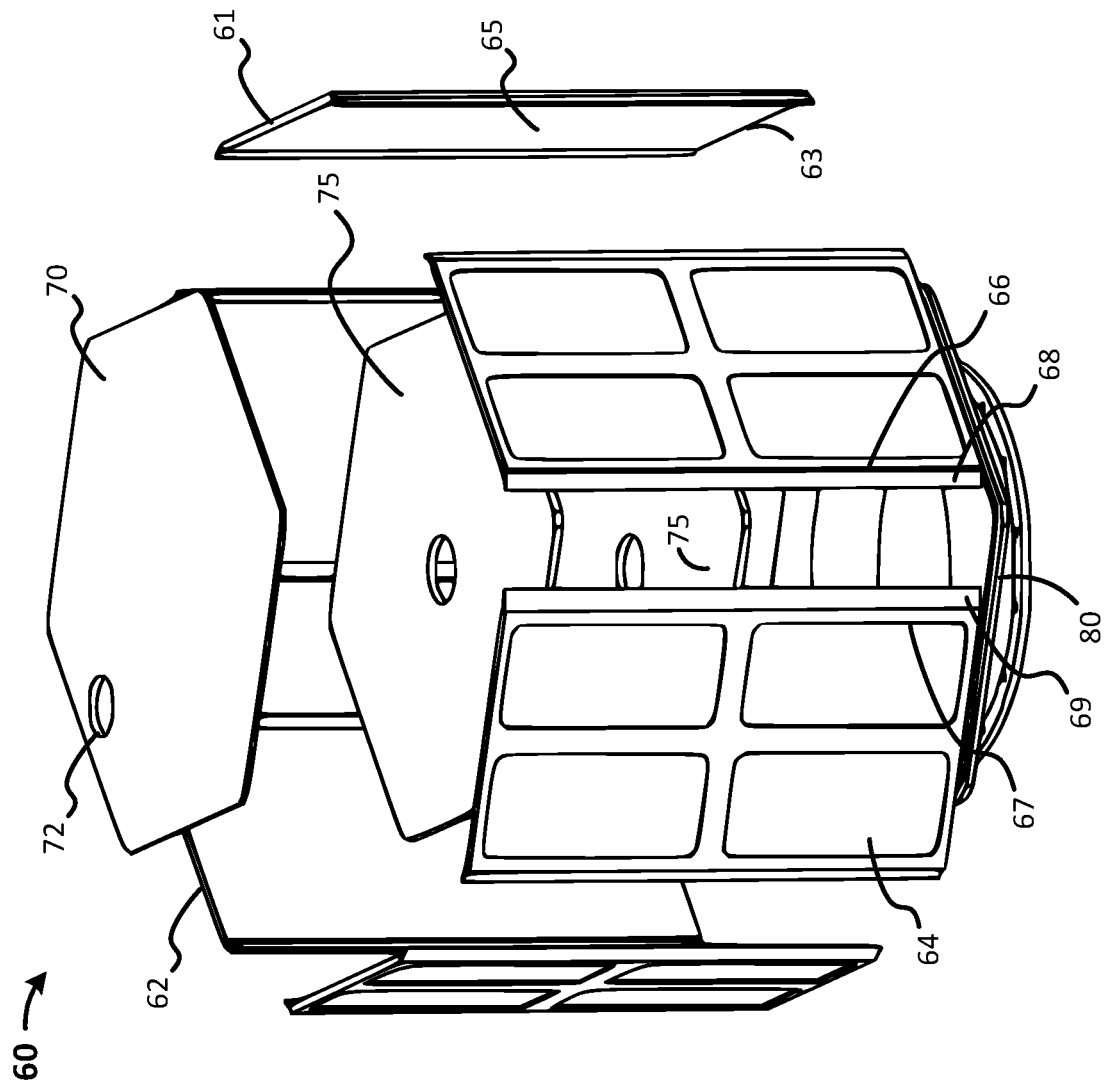
FIG. 22 is an exploded view of a self-jigging modular satellite bus.

Satellite bus 60, as shown in FIG. 18, is a main structural component or framework of a satellite. Satellite bus 60 is self-mating in the sense that each of the side panels of the satellite bus fit together without requiring additional support materials. Self-mating can also be referred to herein as self-jigging. Fasteners or adhesives may be used to secure the side panels to one another, but no additional framework materials are required to build the satellite bus 60. Although a half-hexagonal shaped satellite bus is shown in FIGS. 18-21, similar structures and techniques can be applied to the sectioned satellite buses shown in FIGS. 1-17. For example, satellite bus 60 might instead be a half-octagon, triangle, or other sectioned polygon-shaped satellite buses. Other configurations shown in FIGS. 2-17 might also be formed in a similar manner using the self-mating or self-jigging techniques. FIG. 22 shows an example full hexagonal satellite bus as an example of final assembly for a satellite bus.

A side panel 61 of the satellite bus 60 is shown in FIG. 18. The satellite bus 60 is modular in the sense that each side panel 61 is a standardized part that can be formed from a single die or mold, such that each side panel 61 is virtually identical to the other side panels. FIG. 18 also shows top panel 70 and bottom panel 80. When assembled, the corresponding number of side panels 61, along with top panel 70 and bottom panel 80 form a completed satellite bus.

Figure 19:
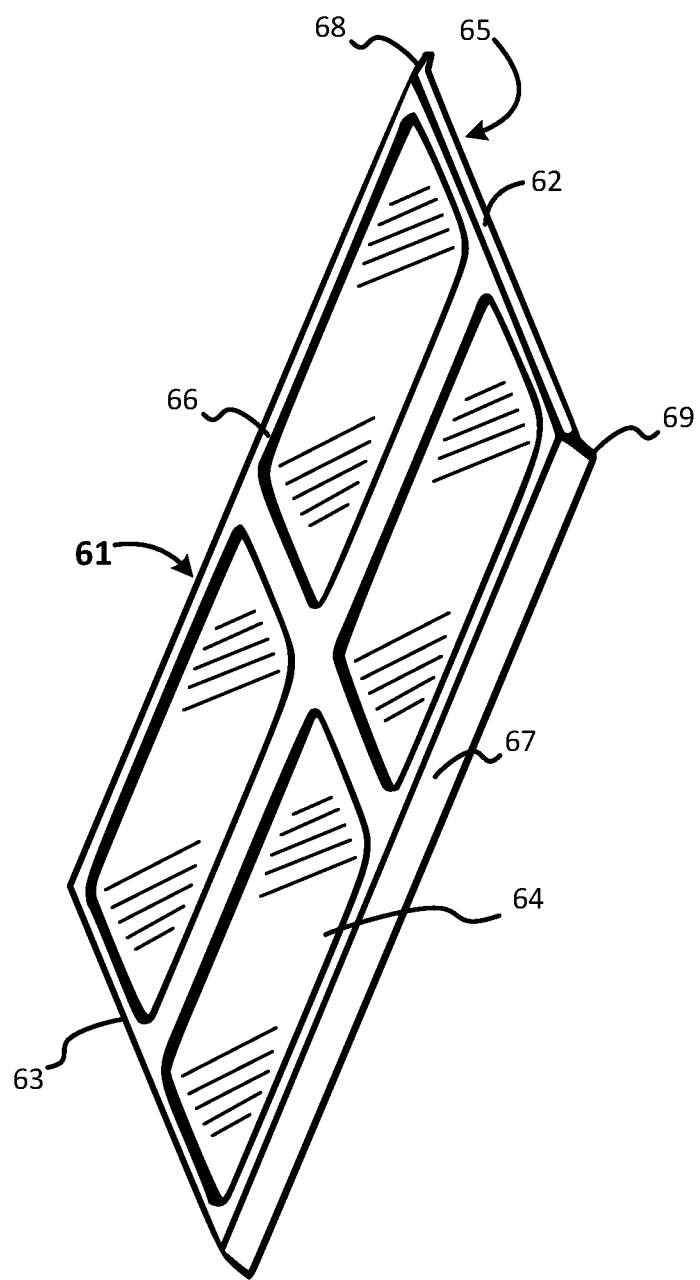
FIG. 19 is a perspective view of a single side panel of an individual satellite bus.

A front surface 64 of the side panel 61 is shown in FIG. 19. The front surface 64 is flanked by a first longitudinal edge 66 and a second longitudinal edge 67. When the side panels 61 are arranged to form the satellite bus 60, the first longitudinal edge 66 of each side panel 61 is nested with the second longitudinal edge 67 of an adjacent side panel.

Figure 20B:
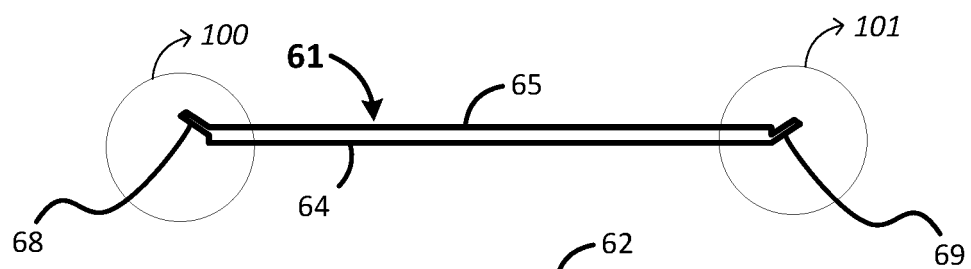
FIG. 20B is a top view of the side panel in FIG. 20A.
Figure 20A:
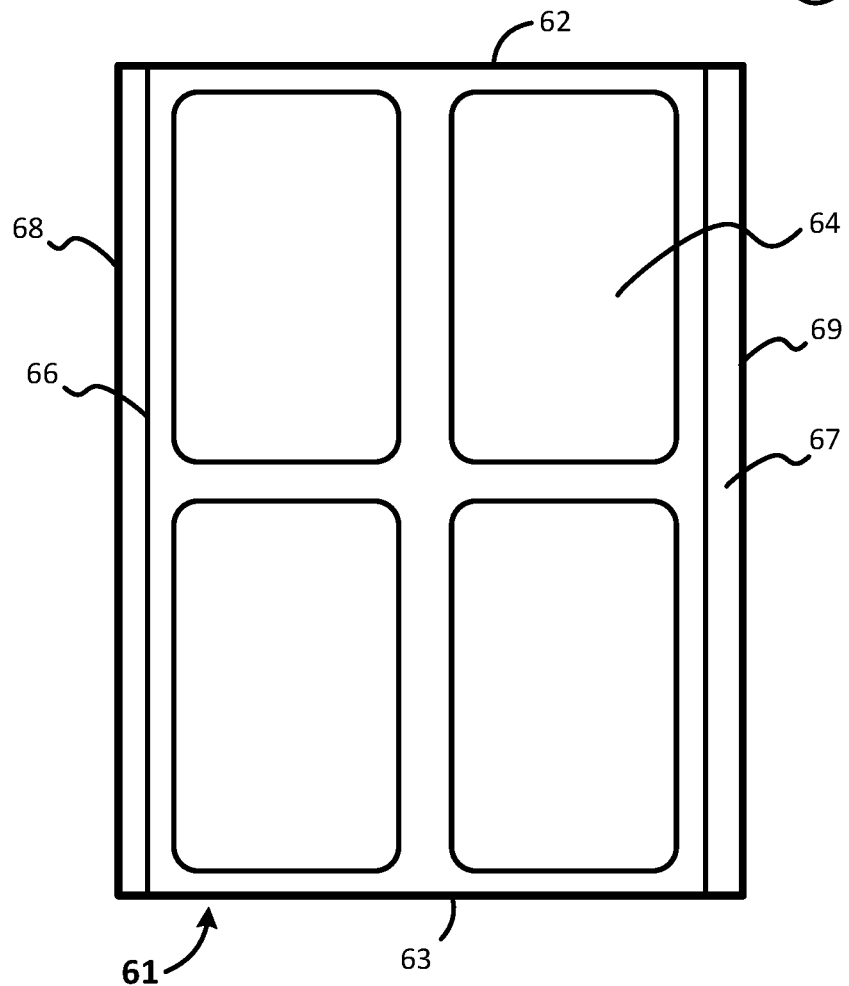
FIG. 20A is a front view of the side panel of an individual satellite bus.

FIG. 20B is a top view of the side panel 61 shown in FIG. 20A, illustrating one example of the modular side panel 61 that can be nested with adjacent panels. As shown in FIG. 20B, the first longitudinal edge 66 has a first flange 68 and the second longitudinal edge 67 has a second flange 69. The first flange 68 superimposed on the second flange 69 together form a joggle, such that the first and second flanges 68 and 69 nest or fit together. The nesting or fit of first and second flanges 68 and 69 is due to the associated geometric configuration.

Figure 20C:
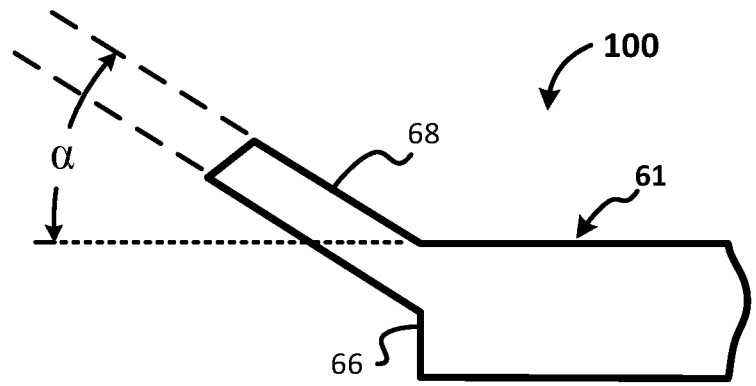
FIGS. 20C and 20D are close-up views of the side panel indicated in FIG. 20B.
Figure 20D:
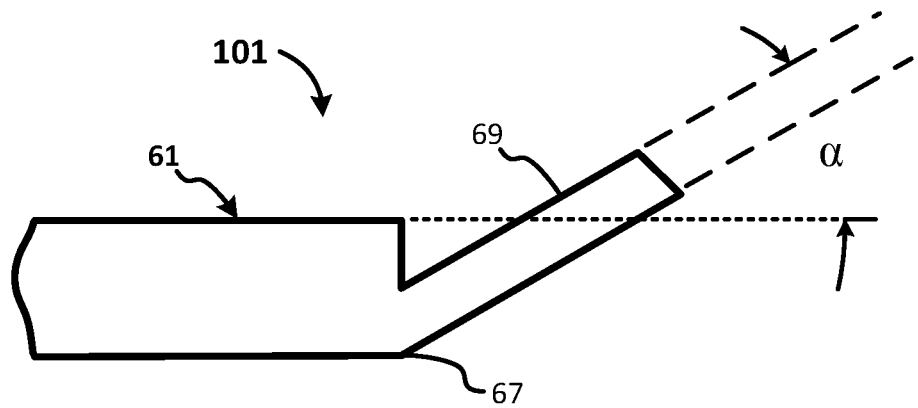

FIGS. 20C and 20D are close-up views 100 and 101 of the side panel 61, particularly the flanges 68, 69, indicated in FIG. 20B. In this particular example, each flange 68, 69 is an angled extension of the respective longitudinal edge 66, 30, with each flange 68, 69 forming the same angle α with the front surface 64, but slightly offset with respect to one another. More particularly, the flanges 68, 69 are offset, with the first flange 68 set back from the front surface 64 and the second flange 69 set back from a back surface 65 of the side panel 61. The offset front-and-back spacing of the flanges 68, 69 allows the flanges 68, 69 of adjacent side panels 61 to nest together to form a joggle. The flanges 68, 69 may be straight as shown in FIGS. 20B, 20C, and 20D, or they may be stepped with complementary stepping or reverse bends that nest to form a joggle, or they may include any other complementary shaping that nests to form a joggle. A joggle, as referred to herein, is a joint between two adjacent pieces/panels. The joggles herein are formed from a projection of a first panel fitting into a notch of a second panel, and vice-versa.

The first longitudinal edge 66 of each side panel 61 may be secured to the second longitudinal edge 67 of the adjacent side panel 61 using any suitable means. In certain configurations the application of pressure may be sufficient to secure the first and second longitudinal edges 66, 67 together. For example, according to some examples, the first flange 68 may include one or more projections or teeth that fit into one or more recesses or notches in the second flange 69 to prevent slipping. Alternatively, the first and second flanges 28, 30 may form other types of complementary snap or pressure-induced connections.

A glue or adhesive is another option for securing the first and second longitudinal edges 66, 67 to one another. Examples of suitable adhesives include various epoxies (e.g. single, dual, or multi-component epoxies), cyanoacrylate, acrylic adhesives, urethane adhesives, or other suitable adhesives. The adhesive can be selected based on the application of the final assembly, such as space-based applications, high-ultraviolet (UV) exposure applications, low-temperature conditions, or other applications. The adhesive can be applied to a surface of one or both flanges 68, 69 that comes into contact with other flanges 68, 69. Various surface preparation might occur prior to application of adhesive, such as abrasive preparation, cleaning, solvent application, or other preparation.

Once adhesive has been applied between two adjacent panels via first and second longitudinal edges 66, 67, then further panels can be bonded to the existing panels. A similar adhesive-based process can be used to adhere further panels together to form a hex shape or other corresponding geometric shape based on selection of the angle α. Clamps, belts, vises, or other mechanisms can be used to hold a desired shape or ensure structural integrity of the assembled panels until the adhesive has been cured or dried. Further curing processes can be employed, such as heat, pressure, vacuum, UV exposure, or other curing techniques.

Another technique for securing the first and second longitudinal edges 66, 67 together is the use of fasteners. For example, screws or bolts and corresponding nuts, or rivets, or any other suitable mechanical fastener could be used. Clamps or spring-form fasteners might instead be employed. Alternatively, the first and second longitudinal edges 66, 67 could be welded together.

The satellite bus 60 may include any suitable number of side panels 61. As shown in FIG. 18, the satellite bus 60 may include three side panels 61 forming a half-hexagon shape. One or more additional 'flat' back panels might be included using similar self-mating or self-jigging techniques. When the satellite bus 60 is in the form of a hexagon (or portion thereof), the angle α between the front surface 64 of each side panel 61 and flange 68, 69 is 30°. The hexagon shape is efficient for fitting into a void created by a round nose cone or fairing of a rocket. When half-hexagons are employed, two such half-hexagons can be included. Thus, six side panels are employed to form two half-hexagons, with three per satellite bus.

Alternatively, the satellite bus 60 may include four side panels 61 forming a square with an angle α of 45° between the front surface 64 of each side panel 61 and flange 68, 69. When the satellite bus 60 includes five side panels 61 forming a pentagon, the angle α is 36° between the front surface 64 of each side panel 61 and flange 68, 69. When the satellite bus 60 includes seven side panels 61 forming a heptagon, the angle α is 25.7° between the front surface 64 of each side panel 61 and flange 68, 69. When the satellite bus 60 includes eight side panels 61 forming an octagon, the angle α is 22.5° between the front surface 64 of each side panel 61 and flange 68, 69.

Each shape can be selected based on application, launch platform restrictions, weight requirements, payload enclosure requirements, or other application requirements. In other examples, the shape and angle α can be selected to best suit on-board components of the satellite bus, such as solar panels, communication antennas, imaging sensors, propulsion components, inertial adjustment components, or other components. Each of the polygonal shapes mentioned above might be formed from more than one individual satellite bus, such as seen in FIGS. 1-17. Truncated polygonal shapes can be combined or fit together to form the full polygonal shape within a rocket fairing.

FIGS. 21A-21D show various views of the satellite bus 60 illustrated in FIG. 18. FIG. 21A shows a front view of the satellite bus 60. FIG. 21B shows another front view of the satellite bus 60 rotated approximately 30° from the view in FIG. 21A. FIG. 21C shows two satellite busses 60 fit together to form a hexagonal shape.

The two satellites in FIG. 21C can be included in a rocket fairing for a compact launch configuration. Gap 90 might be included to provide space for external components, such as solar panels, antennas, propulsion elements, heat radiation elements, and the like. Back panels 77 can also be included in each satellite bus 60, which might be self-jigging or self-mating with side panels 61, using corresponding joggle features with mating angles to nest adjacent mating surfaces together. In some examples, back panels 77 are formed from solar panels or other equipment.

Satellite bus 60 may include a top panel 70, best viewed in FIG. 21C, having a flange 38 that attaches the top panel 70 to each of the side panels 61 along a top edge 62 of each side panel 61. Specifically, the flange 71 on the top panel 70 forms a 90° angle with the top edge 62 of each side panel 61. FIG. 21D shows a side view of the top panel 70 separate from the satellite bus 60, specifically showing the flange 71.

The top panel 70 can be attached to the top edges 62 of the side panels 61 using any of the techniques described above for securing adjacent side panels 61 to one another. For example, the top panel 70 can be secured to the top edges 62 of the side panels 61 using pressure, adhesive, and/or fasteners. Top panel 70 and side panels 61 might also have corresponding joggle features to create bonding surfaces between top panel 70 and side panels 61. The top panel 70 may include one or more apertures 72, which may be used to accommodate an imaging component, such as a camera or for tracking stars, or for any other purpose.

Satellite bus 60 may also include a bottom panel 80, shown in FIGS. 21A and 21B. Like the top panel 70, the bottom panel 80 may also include a flange (not shown) that attaches the bottom panel 80 to each of the side panels 61 along a bottom edge 63 of each side panel 61. Much like the configuration of the flange 71 on the top panel 70, the flange on the base forms a 90° angle with the bottom edge 63 of each side panel 61. The bottom panel 80 can be attached to the bottom edges 63 of the side panels 61 using any of the techniques described above for securing the top panel 70 to the top edges 62 of the side panels 61, such as using pressure, adhesive, and/or fasteners. Bottom panel 80 and side panels 61 might also have corresponding joggle features to create bonding surfaces between bottom panel 80 and side panels 61. The bottom panel 80 may include an adapter, such as another flange, for mounting the satellite to a rocket stage or deployer.

The bottom panel 80 may include one or more apertures to support propulsion components. These propulsion components can include external nozzles, engines, grids, electrodes, or other suitable propulsion extensions from satellite bus 60. A lower chamber might be formed using a corresponding internal deck 75 to separate propulsion components from avionics, power, and sensing components.

Overall, the satellite bus 60 may be comparable in size to a CubeSat form factor, or the satellite bus 60 may be larger or smaller than a CubeSat. Consequently, the satellite bus 60 may be launched in similar types of rockets used to launch CubeSats. In particular, the satellite bus 60 may have an overall height (y), 40 cm, depicted in FIG. 21B, between about 35 cm and about 45 cm, or between about 20 cm and about 35 cm, or between about 45 cm and about 75 cm. The individual side panels 61 may have a height (y, z), 40 cm, depicted in FIG. 21A, between about 30 cm and about 45 cm, or between about 20 cm and about 35 cm, or between about 45 cm and about 75 cm. Satellite bus 60, when formed into a hexagonal shape with a second satellite bus 60, may have a diameter (w), 45.7 cm, depicted in FIG. 21C, between about 350 cm and about 45.7 cm, or between about 45.7 cm and about 75 cm, or between about 75 cm and about 100 cm. Individual half-hex satellite busses can have a diameter corresponding to half of the hexagonal diameter. The satellite bus 60, on its own, may weigh between about 500 grams and about 1000 grams, or between about 750 grams and about 1500 grams, or between about 1500 grams and about 6000 grams. It should be understood that satellite bus 60 can have other dimensions and weights.

FIG. 22 is included to show a full-hexagonal version of satellite bus 60. Similar principles can be applied for half-hexagonal satellites or other shapes as discussed herein. Satellite bus 60 may either be hollow to house a single chamber of internal components, or the satellite bus may include one or more internal decks 75 or other internals, as shown in FIG. 22 to house more than one chamber of internal components. Each of the side panels 61 may have one or more molded features formed into the back surface 65 facing the inside of the satellite bus 60. The molded features may be designed to hold one or more decks 75 or other externals in place. The molded features may include one or more tabs, fasteners, bonded areas, embossments, or shelves, either for securing a deck 75 or for any other purpose.

The deck 75 may be a propulsion deck or an avionics deck, for example. The avionics deck may include a sun sensor, a star tracker, radio frequency (RF) transceivers, optical transceivers, reaction wheels, wire harnesses, power bus, internal heat radiator connections, and/or any other avionics features. The deck 75 can be attached to the back surface 65 of each of the side panels 61 using any of the aforementioned features on the back surfaces 65 of the side panels 61. The satellite bus 60 may also include internal heat radiator connections, such as one or more thermal straps, secured to the inside of the satellite bus 60 to conduct heat from inside the satellite to the exterior of the satellite through one or more apertures in side panels 61, top panel 70, or bottom panel 80.

According to certain examples, each of the side panels 61 may have a mounting flange on the front surface 64. The mounting flange can be used to attach a solar panel or a window to the front surface 64 of the respective side panel 61. Using a flange to mount the solar panels or windows results in fewer layers in the satellite bus 60, thereby reducing the overall weight of the satellite bus 60.

One of the advantages of the satellite bus 60 is that the design is modular, so the structure is formed by panels, namely side panels 61, a top panel, and a bottom panel 80. The side panels 61 can all be formed from the same manufacturing die. The side panels 61 can have predetermined features to hold decks and other equipment, in accordance with a user's specifications. The predetermined features may be obtained either by using a single die that includes the desired features for each of the side panels 61, or by modifying a single die to include, for example, a molded feature, tabs, fasteners, bonded areas, embossments, or shelves. Consequently, the satellite bus 60 can be made available as a kit and assembled by a user. Alternatively, the satellite bus 60 can be manufactured according to user specifications, in modular form, and subsequently transferred to the user for final assembly. The internal features of the satellite may be pre-assembled and mounted inside the satellite bus 60 before either the user or the manufacturer seals the satellite bus 60 using associated joggles and flanges, thereby forming a satellite.

A method of producing the modular satellite bus 60 includes forming the side panels 61, which may be achieved using a die or a set of male and female dies, or any other suitable casting or molding process. More particularly, the die can be filled with a composite material, such as laser-cut carbon, pre-impregnated fiberglass, carbon, resin, and combinations thereof. The die can then be compressed, using a jig, belts, hydraulic press, or any other suitable pressure-inducing device, to form at least one compressed composite structure in the shape of a side panel 61. After the material has been compressed in the die, any excess material extending from the die can be trimmed. Depending on the material used, it may be necessary or at least beneficial to heat or otherwise cure the resulting side panel 61 either before or after removing the side panel 61 from the die. Vacuum chambers might be employed during formation of side panels to ensure desired curing of the associated composite material. Other manufacturing techniques may be used to form the side panels 61 as well, such as additive manufacturing or 3D printing.

As described above, the satellite bus 60 may have any reasonable number of side panels 61, such as three, four, five, six, seven, or eight. Each side panel 61 can be formed in the same manner using the same die, such that all of the resulting side panels 61 in any satellite bus 60 are identical.

Another advantage of the satellite bus 60 design is that only a simple modification of the process is needed to vary the number of side panels 61 in a resulting satellite bus 60. As described above, the side panels 61 joined together have an angle between them, which is two times the angle $\alpha$ between the front surface 64 of each side panel 61 and flange 68, 69. This angle a varies with the number of side panels 61 in the satellite bus 60. By simply changing the angle $\alpha$ in the die or during additive manufacturing or other process used to form the side panels 61, essentially any polygonal shape of satellite bus 60 can be formed. Thus, the same die, albeit with modified flange or joggle angles $\alpha$, can be used to form satellite buses of virtually any polygonal shape.

In order to form a square satellite bus 60 having four side panels 61, the flange or joggle angle a can be set at 45° between the front surface 64 of each side panel 61 and flange 68, 69. In order to form a pentagonal satellite bus 60 having five side panels 61, the flange or joggle angle a can be set at 36° between the front surface 64 of each side panel 61 and flange 68, 69. In order to form a hexagonal satellite bus 60 having six side panels 61, the flange or joggle angle $\alpha$ can be set at 30° between the front surface 64 of each side panel 61 and flange 68, 69. In order to form a heptagonal satellite bus 60 having seven side panels 61, the flange or joggle angle $\alpha$ can be set at 25.7° between the front surface 64 of each side panel 61 and flange 68, 69. In order to form an octagonal satellite bus 60 having eight side panels 61, the flange or joggle angle a can be set at 22.5° between the front surface 64 of each side panel 61 and flange 68, 69.

The top panel 70 and the bottom panel 80 can each be formed according to the same processes as the side panels 61, such as die-forming or additive manufacturing. One or more holes or apertures may be stamped into the top panel 70, the bottom panel 80, and/or the side panels 61 for various reasons, such as to accommodate propulsion components, sensors, cameras, solar arrays, antennas, star trackers, and the like.

Additionally, one or more molded features may be formed into the back surface 65 of each of the side panels 61. These features may be designed to hold one or more decks 75 or other externals in place inside the satellite bus 60. For example, one or more tabs, fasteners, bonded areas, embossments, or shelves may be molded into or attached to the back surface 65 of each side panel 61.

Furthermore, a mounting flange may be molded into or otherwise attached to the front surface 64 of each of the side panels 61. The mounting flange can be used to attach a solar panel or a window to the front surface 64 of the respective side panel 61, which may be done either before or after the side panels 61 are secured to one another.

Once each of the side panels 61 for a particular satellite bus 60 has been formed, the side panels 61 can be aligned with the first longitudinal edge 66 of each side panel 61 aligned with the second longitudinal edge 67 of an adjacent side panel, such that the first longitudinal edge 66 of each side panel 61 is nested with the second longitudinal edge 67 of the adjacent side panel. In certain examples, the first and second longitudinal edges 66, 67 may snap or otherwise fasten together. In any case, various mechanisms, such as clamps or belts, may be used to hold the side panels 61 in place while securing the side panels 61 to one another. However, side panels 61 are self-jigging in that each side panel nests into one or more adjacent side panels without additional tooling or jigs. As described above, the first and second longitudinal edges 66, 67 can be secured to one another either by snapping together using pressure, or using one or more fasteners, or by applying an adhesive to the flanges 71, 32 along the longitudinal edges 66, 67.

Any internal features of the satellite may be manufactured separately, pre-assembled, and mounted inside the satellite bus 60, particularly using the features that are molded or attached to the back surface 65 of each of the side panels 61 to secure the internal features in place, during assembly of the satellite bus 60. Such internal features may include, for example, one or more decks 75, such as a propulsion deck or an avionics deck, and corresponding features of the decks, such as a sun sensor, a star tracker, a radio, reaction wheels, and/or a wire harness. One or more thermal straps may also be secured to the inside of the satellite bus 60 during assembly.

After the side panels 61 are secured to one another, the top panel 70 can be attached to each of the side panels 61 along the top edge 62 of each side panel 61. Also, the bottom panel 80 can be attached to each of the side panels 61 along the bottom edge 63 of each side panel 61.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above can be combined in various ways to form multiple embodiments. As a result, the invention is not limited to the specific embodiments described above, but only by the claims and their equivalents.

What is claimed is:

1. A sectioned satellite bus arrangement comprising:
   a plurality of separate satellite buses each having a polygonal shape formed using at least side panels mated using nesting joggle features;
   wherein the plurality of separate satellite buses each fit together to form a regular polygon; and
   wherein each of the plurality of separate satellite buses comprise:
   a plurality of side panels arranged into the polygonal shape by at least nesting flanged longitudinal edges of each side panel into flanged longitudinal edges of adjacent side panels;
   each of the plurality of side panels comprising a compressed composite material forming a front surface flanked by a first longitudinal edge and a second longitudinal edge;
   the first longitudinal edge of each side panel comprising a flange forming an angle with the front surface;
   the second longitudinal edge of each side panel comprising a flange forming an angle with the front surface; and
   wherein a surface of the flange along the first longitudinal edge of each side panel nests with a surface of the flange along the second longitudinal edge of the adjacent side panel to form a joggle.

2. The sectioned satellite bus arrangement of claim 1, wherein the sectioned satellite bus is configured to fit into a nose cone of a rocket.

3. The sectioned satellite bus arrangement of claim 1, wherein each of the separate satellite buses has the same polygonal shape.

4. The sectioned satellite bus arrangement of claim 1, comprising two isosceles trapezoidal satellite buses that fit together to form a hexagonal sectioned satellite bus.

5. The sectioned satellite bus arrangement of claim 1, wherein each of the plurality of separate satellite buses are triangular.

6. The sectioned satellite bus arrangement of claim 1, wherein one of the plurality of separate satellite buses forms a first half of the regular polygon and a remainder of the plurality of separate satellite buses together form a second half of the regular polygon.

7. The sectioned satellite bus arrangement of claim 1, further comprising a solar panel attached to one side panel or top panel of each of the separate satellite buses with a mounting flange.

8. The sectioned satellite bus arrangement of claim 7, wherein each of the solar panels is folded against one side panel of a respective separate satellite bus when the satellite bus is fit together with one or more separate satellite buses to form the sectioned satellite bus.

9. The sectioned satellite bus arrangement of claim 1, wherein each of the separate satellite buses comprises an aperture in at least one side panel for attachment of an external component.

10. A satellite bus comprising:
    a plurality of side panels coupled at mating edges with nesting joggle features that form a polygonal shape;
    wherein the satellite bus fits together with one or more other satellite buses to form a sectioned satellite bus arrangement having a regular polygon shape; and
    wherein the satellite bus comprises:
    the plurality of side panels arranged into the polygonal shape by at least nesting flanged longitudinal edges of each side panel into flanged longitudinal edges of adjacent side panels;
    each of the plurality of side panels comprising a compressed composite material forming a front surface flanked by a first longitudinal edge and a second longitudinal edge;
    the first longitudinal edge of each side panel comprising a flange forming an angle with the front surface;
    the second longitudinal edge of each side panel comprising a flange forming an angle with the front surface; and
    wherein a surface of the flange along the first longitudinal edge of each side panel nests with a surface of the flange along the second longitudinal edge of the adjacent side panel to form a joggle.

11. The satellite bus of claim 10, wherein the plurality of side panels form a half-hexagon shape.

12. The satellite bus of claim 10, wherein the plurality of side panels form a quarter-hexagon shape.

13. The satellite bus of claim 10, wherein the plurality of side panels form a triangle shape.

14. The satellite bus of claim 10, further comprising a solar panel attached to one of the side panels or a top panel with a mounting flange.

15. The satellite bus of claim 14, wherein the solar panel is folded against one of the side panels when the satellite bus is fit together with one or more other satellite buses to form the sectioned satellite bus arrangement.

16. The satellite bus of claim 10, wherein at least one of the side panels comprises an aperture for attachment of an external component.

17. A satellite comprising the satellite bus of claim 10.

18. A method of producing a sectioned satellite bus arrangement, comprising:

forming a plurality of separate satellite buses each having a polygonal shape and each comprising a plurality of side panels coupled at mating edges with nesting joggle features;

fitting each of the plurality of separate satellite buses together to form the sectioned satellite bus arrangement in a regular polygonal shape; and wherein forming each of the plurality of separate satellite buses further comprises:

forming the plurality of side panels arranged into the polygonal shape by at least nesting flanged longitudinal edges of each side panel into flanged longitudinal edges of adjacent side panels;

forming each of the plurality of side panels with a compressed composite material that forms a front surface flanked by a first longitudinal edge and a second longitudinal edge;

forming the first longitudinal edge of each side panel as comprising a flange that forms an angle with the front surface;

forming the second longitudinal edge of each side panel as comprising a flange that forms an angle with the front surface; and forming a surface of the flange along the first longitudinal edge of each side panel by at least nesting with a surface of the flange along the second longitudinal edge of the adjacent side panel to form a joggle.

19. The method of claim 18, further comprising:

aligning the first longitudinal edge of each side panel with the second longitudinal edge of an adjacent side panel, such that the first longitudinal edge of each side panel is nested with the second longitudinal edge of the adjacent side panel using angled joggle features formed into the first longitudinal edge and the second longitudinal edge;

securing the first longitudinal edge of each side panel to the second longitudinal edge of the adjacent side panel;

attaching a top panel to each of the side panels along a top edge of each side panel; and attaching a base to each of the side panels along a bottom edge of each side panel.

20. The method of claim 19, further comprising using a die to form each of the plurality of side panels comprising at least the angled joggle features formed by the die into the first longitudinal edge and the second longitudinal edge.

* * * * *

UNITED STATES PATENT AND TRADEMARK OFFICE
CERTIFICATE OF CORRECTION

PATENT NO. : 10,689,131 B2
APPLICATION NO. : 16/028821
DATED : June 23, 2020
INVENTOR(S) : Raymond Edward Fraze It is certified that error appears in the above-identified patent and that said Letters Patent is hereby corrected as shown below:

In the Specification

Column 10, Line 12, delete "a" and insert --α--

Column 10, Line 20, delete "a" and insert --α--

Column 10, Line 23, delete "a" and insert --α--

Column 10, Line 33, delete "a" and insert --α--

Signed and Sealed this
Eighth Day of December, 2020

Andrei Iancu
*Director of the United States Patent and Trademark Office*